Patented May 19, 1936

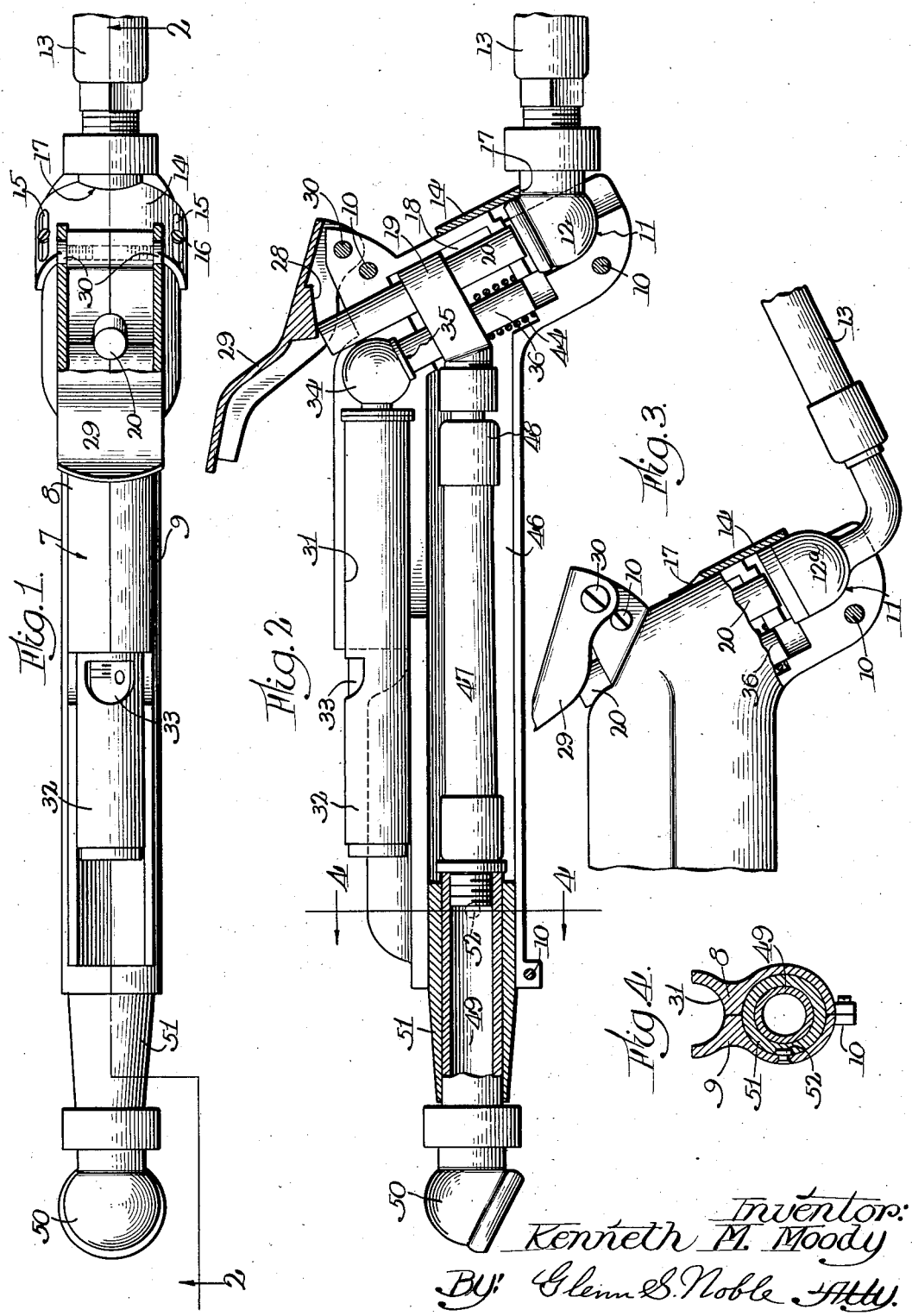

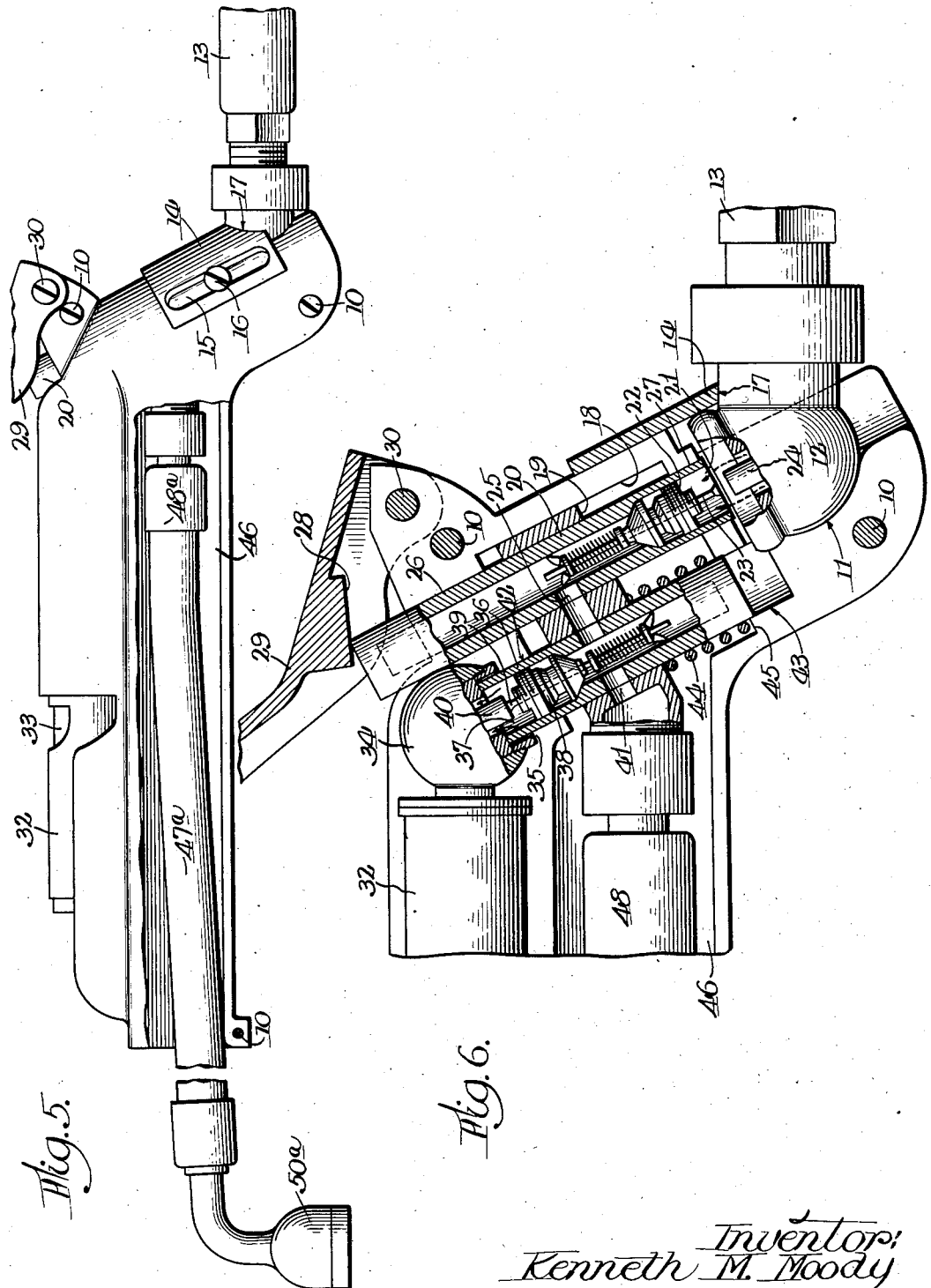

2,040,868

UNITED STATES PATENT OFFICE 2,040,868

TIRE INFLATER

Kenneth M. Moody, Chicago, Ill.

Application January 23, 1933, Serial No. 653,209

8 Claims. (Cl. 152—11.5)

This invention relates to means for inflating a tire or the like and coacting means associated therewith for determining the pressure in the tire. While such combined inflating and gauge devices have heretofore been proposed for use at the end of the air supply hose, they have usually been either too complicated or too fragile for such purpose. When such devices are arranged at the end of the hose for direct application to the tires, they are usually subjected to more or less careless use and unless rugged and substantial in construction are not adapted for ordinary commercial purposes.

The objects of this invention are to provide an improved tire inflater having a gauge for indicating the pressure in the tire, which will be simple in construction and durable and efficient in use; to provide a device of this character in which standard tire valve "insides", standard chucks and standard gauges may be used exclusively or to the fullest possible extent; to provide a device of the character indicated for mounting and clamping together the tire gauge and other standard parts in operative relation for the purposes indicated; to provide means whereby different types of chucks, valves and gauges, such as the "Schrader" and "Dill", may be used interchangeably in the same structure; to provide means for mounting an air gauge in co-operative relation with tire inflater mechanism whereby the gauge will be fully protected; to provide a device of this kind which may be readily manipulated with one hand; and to provide such other advantages and novel features as will appear more particularly from the following description taken in connection with the accompanying drawings.

In these drawings,

Figure 1 is a top plan view with parts broken away or shown in section;

Figure 2 is a longitudinal view taken on the line 2—2 of Figure 1 showing one half of the casing removed and other parts shown in section;

Figure 3 is a detail showing the position of the clamp for clamping a "Dill" chuck at the inlet;

Figure 4 is a cross section taken on the line 4—4 of Figure 2;

Figure 5 is a side view with parts broken away to show a modified construction; and Figure 6 is an enlarged sectional detail of the movable operating member and valves carried thereby.

In the particular form of the invention shown in these drawings, 7 is a split housing or casing comprising right and left hand complementary sections 8 and 9, respectively. These sections are secured together in any convenient manner as by means of screws or bolts 10. This casing is somewhat in the form of a pistol with a grip simulating portion at one end which is at an angle to the axis of the main portion. Recesses or substantially semi-spherical cavities are formed in the side pieces which provide a chuck cavity or chamber 11 at the inlet end to receive a chuck 12 on the end of a supply hose 13 from any suitable supply of air under pressure. As shown in Figure 2, the chuck 12 is of the "Schrader" type and is securely fastened in position by a curved plate 14 having slots 15 in the sides thereof through which extend screws 16 for securing the plate to the housing. One end of the plate is bifurcated or provided with a recess 17 which fits over the neck of the chuck 12 as shown particularly in Figure 2, in order to hold the chuck securely in the recess or chamber 11.

When a chuck 12a of the "Dill" type is used on the supply hose 13, the plate 14 is arranged in reverse position as shown in Figure 3, with the groove 17 at the inner end, in order to more fully support the chuck in its recess.

The casing 7 has another cavity or chamber 18 adjacent to the chuck chamber 11, for receiving the controlling or actuating devices. A hollow body or cylinder 19 is movably mounted in the chamber 18 and carries the valve operating and air transferring devices. A tube 20, which may be a tire valve tube or the like, is mounted in the body 19 and has its open end 21 in juxtaposition or alignment with the open end of the air chuck 12 as shown in Figure 6. This tube is provided with the usual or standard air valve "insides" 22 having a valve stem 23 which is adapted to coact with the projection or stem 24 of the chuck valve. The tube 20 has access to the body 19 through an opening 25 so that air admitted to the open end thereof may pass freely into said body. The tube 20 preferably extends through the body and is closed at its other end. Bearings 26 and 27 are provided in the housing for guiding the tube 20 in its longitudinal movement.

The outer end of the tube 20 is engaged by a projection 28 on a lever 29 which is pivotally connected as at 30 to the housing, for operating the device as will presently be described.

Each section of the housing is also provided with longitudinal semi-cylindrical cavity, said cavities being opposed to form a gauge chamber 31 for receiving a gauge 32 which may be of any well known standard type such as a "Schrader" or "Dill" but which is shown as being of the "Dill" type, in which the numerals of the indicating member may be seen through a window or opening 33 in the side of the gauge cylinder. The gauge is provided with a chuck or connecting member 34 which has its face or opening 35 at a slight angle to the axis of the gauge. Another tube 36 which is similar to a tire filling tube or nipple extends through and is secured to the hollow body or cylinder 19. The open end 37 of this tube is adapted to coact with the chuck or connecting member 34 of the gauge. This tube is arranged to receive and is provided with standard valve "insides" 38 such as the "Schrader" or "Dill" having a valve stem 39 which is adapted to be actuated by the pin 40 in the chuck 34. The tube 36 is closed at its other end but has access to the hollow body 19 through openings 41 in alignment with the opening 25. The housing 7 has bearings 42 and 43 for the projecting ends of the tube 36. It will be noted that the tube 36 is at right angles to the face or open end 35 of the chuck 34 which accounts for the angular portion of the housing which is arranged to accommodate such tube and coacting parts and place them in operative relation with the gauge and the chuck of the supply tube. It will therefore be apparent that if the opening in the air gauge is at a different angle, the parts would be arranged correspondingly. The movable body 19 is held in normally raised position as shown in Figure 6, by means of a spring 44 which is interposed between the side of the body and an abutment 45 formed by the bearing 43. It will also be noted that the movable body 19 and the tubular parts coacting therewith may be made integrally if desired.

The main longitudinal portions of the complementary sections 8 and 9 forming the housing 7 have semi-cylindrical cavities running lengthwise thereof to form a chamber 46 which is substantially parallel with the chamber 31 and which is adapted to enclose portions of the air conducting devices. In the arrangement shown in Figures 1 and 2, a short hose 47 is connected by means of a swivel connection 48 with the hollow body 19. The opposite end of the hose is connected with a tube 49 which carries a chuck or nozzle 50 for making connection with the tire filling tube. The tube 49 is rotatably mounted in a sleeve 51 and its longitudinal movement therein is limited by the connecting members at each end thereof. The sleeve 51 is clamped between the end portions of the housing and is further held against movement by means of a pin or projection 52 in the side of the housing which engages with a suitable hole or recess in the side of the sleeve.

While the form shown in Figures 1 and 2 is particularly intended for use with one hand I have also shown a modification in Figure 5 which is adapted to be used with two hands. In this form the hose 47a is connected to the movable body member 19 by means of a swivel connection 48a and extends out from the chamber 46 any suitable distance and has the tire filler chuck or nozzle 50a connected directly therewith.

When a tire is to be filled by means of the device particularly shown in Figures 1 and 2, the operator grasps the housing in one hand and presses the chuck or nozzle 50 onto the tire filler tube or valve stem in the usual manner which causes the tire valve and the chuck valve to be opened thereby permitting air to enter the hollow body 19 through the hose 47 and connected parts. In the normal position of the hollow body, the valve tube 36 is pressed against the chuck or connecting member 34 of the gauge which depresses the valve stem 39 and leaves a free passageway from the body into the gauge, thus causing the gauge to indicate the pressure in the tire. In this connection it will be noted that when a "Schrader" gauge is used the chamber and adjacent portions of the housing tend to protect the gauge when the recording member is in projected position as well as in retracted position.

If the user desires more air he presses down on the handle or lever 29 which causes the hollow body 19 and connected parts to move downwardly so that the tube 36 is disengaged from the gauge and the valve therein is closed. The downward movement of the body causes the valve tube 20 to coact with the chuck 12 to open the valve in the tube and also the valve in the chuck in the usual manner thereby permitting air from the air supply hose 13 to enter the body or cylinder 19 from whence it passes through the hose 47 and connected parts into the tire. At any time it is desired to determine the tire pressure the handle 29 is released and the movable parts returned to normal position under the action of the spring 44 thereby again establishing connection with the gauge. The operation of the form shown in Figure 5 is substantially the same except that the hose 47a is preferably of convenient length so that one hand is used for applying the chuck 50a and the other hand is used for manipulating the inflater in the manner above described. It will be particularly noted that with this form the swivel 48a for the hose is at its inner end and the swivel and adjacent parts of the hose are fully protected from the weather while the chuck may be conveniently manipulated for making connection with the tire.

From this description it will be seen that I provide a simple and convenient method of assembling and utilizing various standard parts or instruments such as tire gauges, valves and chucks for use in a tire inflater whereby repairs may be readily made. Furthermore, the device is rugged and substantial in construction so that it is adapted to be used out of doors where it is subjected to adverse weather conditions as well as more or less rough usage.

While I have illustrated preferred forms of my invention, it will be observed that changes may be made in the construction thereof or in the arrangement of the parts in order to adapt it for different instruments or conditions, without departing from the scope of my invention. Having thus described the same, what I claim and desire to secure by Letters Patent is:

1. A combined tire inflater and gauge comprising a sectional casing formed of two similar complementary sections and having a plurality of cavities therein, means for holding the sections together, a tire gauge mounted in one of said cavities and securely held in the casing, a chuck mounted in another of said cavities in said casing and connected with a source of air supply, a hollow member slidably mounted in another of said cavities in said casing, a tube having a valve therein for operatively connecting the hollow member with the gauge when the hollow member is in normal position and disconnecting the same therefrom when said member is moved from normal position, a tube having a valve therein for operatively connecting the hollow member with the chuck when said member is moved from normal position, and disconnecting the same therefrom when the member is in normal position, a lever for actuating said hollow member, a spring for holding the member in normal position, and a conduit leading from said member outwardly through another of said cavities and adapted to be connected with a tire or the like.

2. In a device of the character set forth, the combination of a casing formed of two similar halves and providing a plurality of chambers therein, a pressure gauge mounted in one of said chambers and extending therefrom to expose the indicating portion, a chuck mounted in one of said chambers, detachable means for holding the chuck in the chamber, a hollow body movably mounted in another of said chambers, two tire valve tubes engaging with said hollow body and having openings into the same, bearings for said tubes whereby the body may be reciprocated, a spring tending to hold the body in normal position, a lever pivoted to the casing and adapted to engage with one of said tubes to move the body from normal position, a valve mounted in the last named tube and adapted to coact with the chuck for making and breaking connections therewith, a valve in the other tube adapted to coact with the gauge for making and breaking connections therewith, a hose connected with said hollow body and extending out through another chamber in the casing, and means at the end of the hose for connecting the same with an article to be inflated.

3. A tire inflater comprising a split casing having a longitudinal chamber therein, a sleeve secured in one end of said chamber, a tube rotatably mounted in the sleeve, a chuck at the outer end of the tube, a hollow body mounted in the chamber at the opposite end of the casing and arranged at an angle to the first named chamber, a flexible tube connecting the first named tube and hollow body, a pressure gauge chamber arranged in the casing parallel to the first named chamber, a pressure gauge mounted in the last named chamber with its inlet end adjacent to the hollow body, a tube connected with the hollow body and arranged at right angles to the inlet face of the gauge, a valve in said tube adapted to coact with the inlet portion of the gauge, a spring mounted on the tube and tending to hold the body in raised position, a second tube connected with the body and arranged parallel to the first named tube, a lever pivotally mounted on the casing and adapted to coact with the last named tube for moving the body downwardly, a chuck mounted in the casing with its opening in alignment with one end of the last named tube, a valve in the end of the last named tube adapted to coact with the chuck, and a connection from said chuck to a source of air supply.

4. A tire inflating device of the character set forth, including a longitudinally split sectional casing having a gauge recess therein adapted to receive and support a complete tire gauge having an indicating member movable in and out of the end of the gauge, means for fastening the casing sections together to hold the gauge, said casing also having outwardly projecting side walls adapted to protect the indicating member of the gauge when in projected or retracted position.

5. A device of the character set forth, comprising a two-part casing having complementary sections, each section having a substantially semi-cylindrical cavity running lengthwise thereof and having shorter similar shaped cavities adjacent to the first named cavities and parallel thereto for receiving and holding a tire gauge, said sections also having oppositely disposed cavities adjacent the ends of the first named cavities for receiving a hollow shiftable member, the axis of which is at an acute angle to the axes of the first named cavities, said sections also having substantially semi-spherical cavities communicating with the last named cavities and adapted to receive and hold a hose chuck therein and means coacting with the sections for holding a chuck in said last named cavities.

6. A tire inflating device of the character set forth including a casing formed in two complementary sections with opposed cavities forming a gauge chamber therein, a complete tire gauge having an indicating member movable in and out of the end of the gauge mounted in said chamber, means for fastening the casing sections together to fasten the gauge in said chamber, an air supply hose chuck secured in a chamber in one end of the casing, a hollow body movably mounted in a chamber in the casing, a tube having a valve therein for operatively connecting the hollow body with the gauge when the hollow body is in normal position and disconnecting the same therefrom and closing the passageway through the tube when said body is moved from normal position, a tube having a valve therein for making a connection between the hollow body and said chuck when said body is moved from normal position and closing the passageway through the tube when the body is in normal position, manually operable means for moving said hollow body, a spring tending to hold said body in normal position, a hose having a swivel connection with the hollow body, a tube connected with the outer end of the hose, a chuck secured to the tube, and a bearing in the casing for the tube.

7. A tire inflating device of the character set forth, including a longitudinally split casing formed of complementary sections with opposed cavities providing a gauge chamber therein, a complete tire gauge mounted in said chamber, said casing also having outwardly projecting walls adapted to protect portions of the gauge, a hose chuck secured in a cavity in one end of the casing, a hollow member slidably mounted in a chamber in the casing, a tube having a valve therein for operatively connecting the hollow member with the gauge when the hollow member is in normal position and disconnecting the same therefrom when said member is moved from normal position, a tube having a valve therein for operatively connecting the hollow member with the chuck when said member is moved from normal position and disconnecting the same therefrom when the member is in normal position, a lever for actuating said hollow member, a spring for holding the member in normal position, and a conduit leading from said hollow member comprising a flexible hose having a swivel connection with the hollow member and extending out through a chamber in the casing which is adapted to protect the swivel connection, and a chuck at the outer end of the hose for connecting the same to a tire valve.

8. A tire inflating device of the character set forth, including a casing having a spherically shaped cavity in one end adapted to receive and partially embrace the large ends of different types of chucks and having a slot for receiving the stems of certain types of chucks, a reversible curved plate having a recess in one end and substantially straight across the other end for engagement with chucks of different types, and means for slidably and reversibly securing the plate to the casing.

KENNETH M. MOODY.